(12) United States Patent
Vos

(10) Patent No.: US 6,456,294 B1
(45) Date of Patent: Sep. 24, 2002

(54) METHOD AND CIRCUIT FOR IMPROVING THE CHROMATICS OF ON-SCREEN DISPLAYS ON A VIDEO IMAGE

(75) Inventor: Mark Vos, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/415,546

(22) Filed: Oct. 8, 1999

(30) Foreign Application Priority Data

Oct. 9, 1998 (FR) .............................................. 98 12692

(51) Int. Cl.⁷ ................................................. G09G 5/02
(52) U.S. Cl. ...................................................... 345/601
(58) Field of Search ................................ 345/589, 592, 345/601, 629, 631, 634, 637, 640; 348/447, 497, 970

(56) References Cited

U.S. PATENT DOCUMENTS 5,282,037 A * 1/1994 Eguchi et al. .............. 358/182
5,608,464 A    3/1997 Woodham
5,784,055 A * 7/1998 Ngai .......................... 345/199

FOREIGN PATENT DOCUMENTS

EP          0330732 A2    9/1989
WO          WO86/06233   10/1986

OTHER PUBLICATIONS

French Search Report dated May 10, 1999 with annex to French Application No. 98/12692.

* cited by examiner

Primary Examiner—Michael Razavi
Assistant Examiner—G. F. Cunningham
(74) Attorney, Agent, or Firm—Lisa K. Jorgenson; Stephen Bongini; Fleit, Kain, Gibbons, Gutman & Bongini P.L.

(57) ABSTRACT

A method is provided for forming an on-screen display (OSD) for overlay on a video image. According to the method, colors that are to be used to display the OSD are stored in a color look-up table, and a coefficient of transparency is assigned to each line of pixels of the OSD before overlaying the OSD on the video image. In a preferred method, the colors are stored in the color look-up table as three significant values representing chrominance and luminance for each pixel of the OSD, and the assigned coefficients of transparency are stored in a programmable register. This provides a substantial memory space gain in the color look-up table, and thus the range of available colors can be very wide. A device for forming an OSD for overlay on a video image is also provided. The device includes a color look-up table that stores a color for each pixel of the OSD, and a transparency programming register that assigns a transparency level to each line of pixels of the OSD.

25 Claims, 2 Drawing Sheets

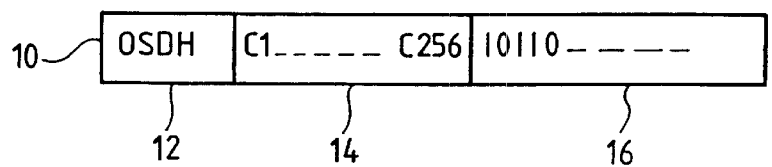
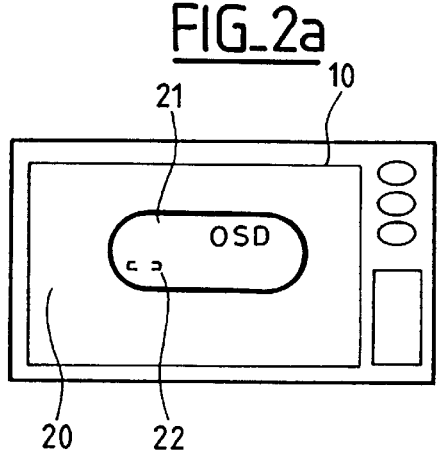 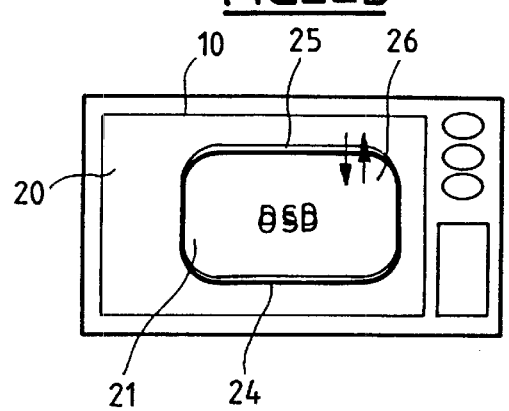
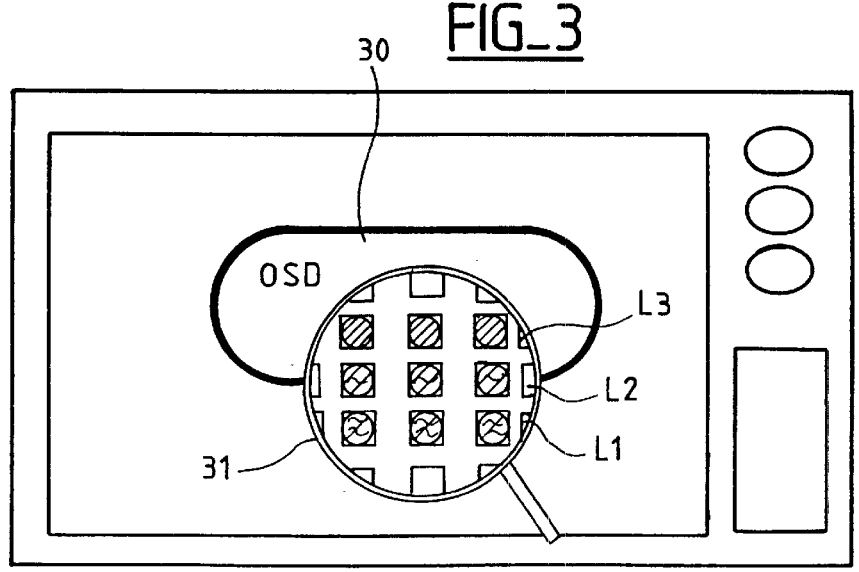

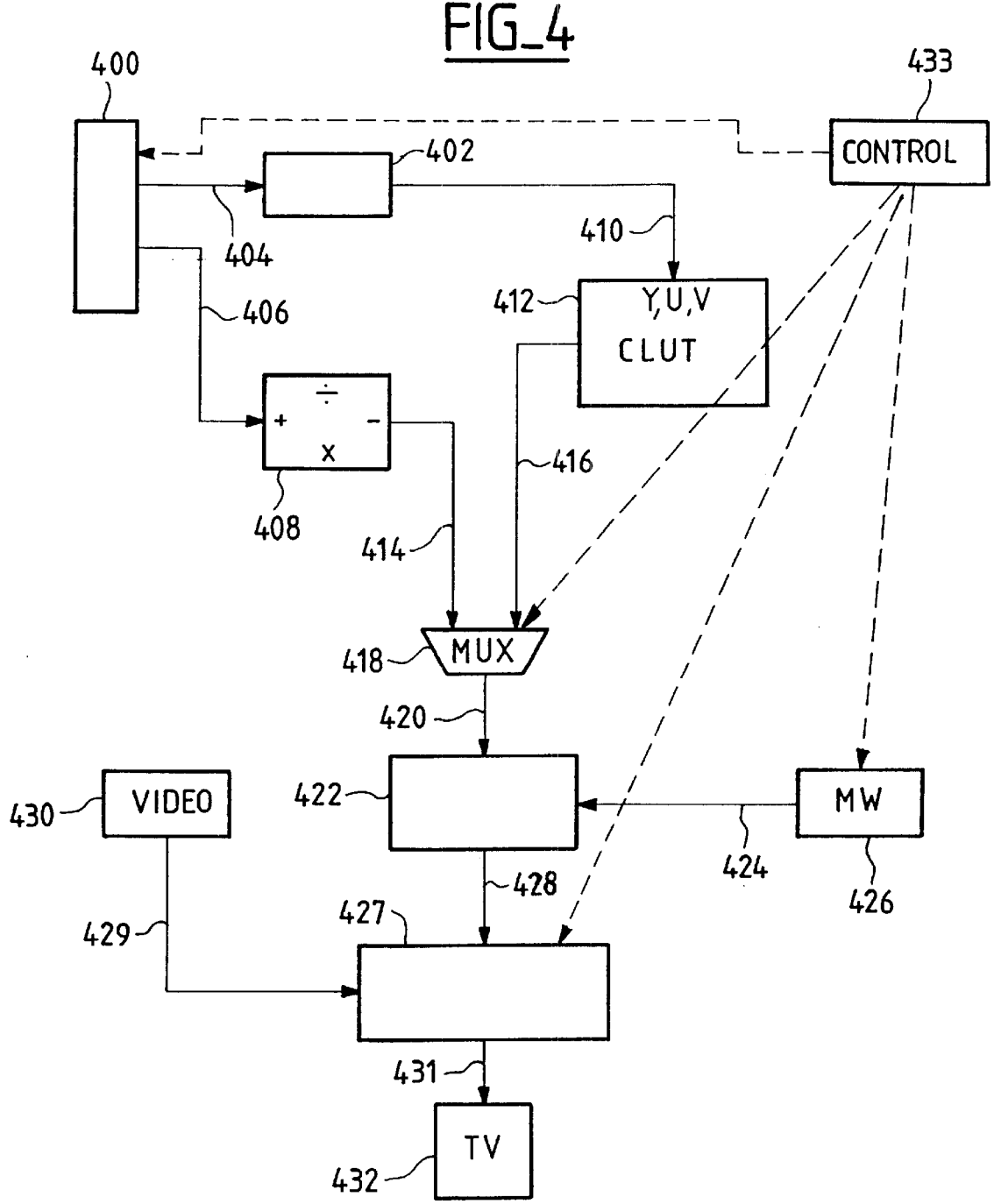

METHOD AND CIRCUIT FOR IMPROVING THE CHROMATICS OF ON-SCREEN DISPLAYS ON A VIDEO IMAGE

CROSS-REFERENCE TO RELATED APPLICATIONS

This application is based upon and claims priority from prior French Patent Application No. 98-12692, filed Oct. 9, 1998, the entire disclosure of which is herein incorporated by reference.

BACKGROUND OF THE INVENTION

1. Field of the Invention

The present invention relates to displays, and more specifically to a method and circuit for improving the chromatics of digital on-screen displays overlaid on a video image by increasing the number of colors available to create the overlays.

2. Description of Related Art

A video image is formed by a sequence of lines of pixels. The pixels are elementary picture elements. In color television systems, each pixel is a carrier of luminance information and chrominance information that makes it possible to specify the luminosity and color of each image point. In the most commonly used television systems, the image develops according to a principle of horizontal scanning of the screen. Whether it is the NTSC television system, the PAL television system, or the SECAM television system, each image displayed results from the alternating display of two distinct partial images known as frames. In general, there is a first frame, which is known as an odd-parity frame, and a second frame which is known as an even-parity frame.

The very nature of television images (i.e., the interlacing of two partial images) gives rise to problems of image quality and flicker. In an extreme case, a line of black pixels on a white image background gives the human eye the unpleasant impression of appearing and disappearing, especially if this line is observed from a close distance. Furthermore, it is increasingly common to present on-screen displays (OSDs) that are overlaid on video images. Each pixel of an OSD is characterized by three values Y, U, and V that determine luminosity and color and a value MW for transparency. For example, OSDs are commonly used to provide a permanent or non-permanent indication of the progress of a sporting event, such as the score of a match. OSDs are also used by certain television channels to show their logo so as to indicate to the viewer the television channel that is being watched.

FIG. 1 shows a conventional structure for the code of an OSD. A binary train 10 containing the codes needed to display an OSD typically consists of three sets of bits that have different functions. A first set of bits 12 forms the OSD header. The OSD header 12 has information on the number of bits needed to define a pixel, and information on the coordinates of certain characteristic points of the OSD. A second set of bits 14 is used to define the panel of colors that will be used during the display of the OSD. All of the colors that will be used are stored in a memory known as a color look-up table (CLUT).

Generally, the CLUT is limited to 256 memory lines, with each memory line containing the values of the bits corresponding to a color programmed in a table through the second set of bits 14. The choice of the size of the color look-up table results from a compromise between the access speed of the table and the number of colors needed to provided accurate quality for the OSD. Additionally, a third set of bits 16 is formed by the addresses of the memory lines of the table of the available colors containing the appropriate color for each pixel of the OSD.

While flicker problems exist, in purely analog television pictures they are small as compared with the flicker phenomena that can appear when digital on-screen displays are presented on a video image background. In particular, the systematic attenuation of contrasts in video images, which is caused by the presence of cameras in the image generation cycle, is not encountered during the creation of an OSD. As a result, two patterns of colors that are distant from each other in the spectrum of visible frequencies may be juxtaposed. Thus, major contrasts may appear between two consecutive lines when digital on-screen displays are overlaid on the video image. Further, when an OSD is created, the background of the video image on which the OSD will be displayed is not generally known. Thus, in extreme cases, a blue OSD may be displayed when the background of the video image is red. Additionally, nothing prevents the designer of an OSD from juxtaposing two lines with high contrast with respect to each other in the OSD itself.

FIGS. 2a and 2b illustrate problems that can be encountered during the display of an OSD on a video image background. FIG. 2a shows a television screen 10 that is displaying an OSD 21 on a video image background 20. The OSD 21 shows a zone with a white background from which there emerges a thin black line with the width of a pixel. This is typically the case where the flicker effect is the most visible. Due to the interlacing of the even-parity and odd-parity frames, the thin black line 22 appears and disappears at a speed that is low enough for this phenomenon to be detected by the human eye.

FIG. 2b shows another problem related to the display of an OSD on a video image background. On the background of a video image 20, an OSD 21 is formed by a first pattern 24 that is displayed with the even-parity frame and a second pattern 25 that is displayed with the odd-parity frame. This gives an impression of flutter 26. More specifically, the OSD seems to rise and fall the amplitude of a pixel at a rate dictated by the refresh frequency of the frames of the image. This flutter problem has the same cause as the flicker problem. The phenomenon of flutter appears when the same image is displayed by the even-parity frame and by the odd-parity frame. Depending on the television system used, the even-parity frame appears every 1/25 seconds or every 1/30 seconds in alternation with the odd-parity frame. The human eye detects a flutter motion due to the appearance of the OSD alternately on one set of lines and then on the set of directly neighboring lines.

These phenomena of flicker and flutter are mainly perceived when long horizontal lines are displayed on the screen, which is frequent in OSDs. There are several conventional approaches to overcoming these problems of vertical transition in the definition of an image having one or more OSDs. For example, it is possible to apply mathematical filters that use the values of neighboring pixels and weighting to compute new values for these pixels. Furthermore, there are circuits that enable automatic detection of excessive color contrasts between succeeding lines. These circuits then automatically carry out the weighting operations associated with the appropriate mathematical filter.

To avoid the sudden transitions of color that give rise to the phenomena explained above, it is also possible to act on the transparency of the pixels of an OSD. This approach is applied to the lines or groups of lines that constitute the boundary zone between an OSD and a video image. When action is taken on a single boundary line between the OSD and the video image, the transparency of the pixel of the OSD is usually 50%. Thus, each pixel of the final image that is located on the boundary has a balanced contribution of the pixels of the video image and of the pixels of the OSD. When several successive lines of the boundary zone are concerned, the transparency of the pixels of the OSD increases when approaching the pixels of the video image.

FIG. 3 shows an example of such a technique. In FIG. 3, an OSD 30 is constituted by portions of pixel lines. Three first lines of the OSD L1, L2, and L3 have the same values Y, U, and V characterizing the luminance and chrominance of each pixel. These lines of pixels differ only by their transparency MW. By way of example, the transparency of the pixels of line L3 is about 25%, the transparency of the pixels of line L2 is about 50%, and the transparency of the pixels of line L1 is about 70%. These transitions are visible in a zone 31 that corresponds to a portion of the screen that is enlarged for clarity. The pixels of the OSD (symbolized by squares) gradually make way for the pixels of the video image (symbolized by circles) that appear through transparency.

This conventional image overlay makes it possible to limit the effects of flicker and flutter when displaying OSDs on a video image. When several lines of an OSD have the same values of the luminance and chrominance information and differ only in their transparency value, it is still necessary to store each of these values in the color look-up table. For example, if all three lines L1, L2, and L3 of the OSD 30 of FIG. 3 are red, it is necessary to store the values that enable the definition of this red color that is associated with the different transparencies for each line L1, L2, L3 in the color look-up table.

However, a color look-up table has a very small size. Generally, the memory capacity of the CLUT is limited to 256 colors, with each color being encoded by 30 bits (i.e., 8 bits for each value Y, U, and V, and 6 bits for the transparency MW). Thus, in the example described above, three memory lines of the OSD are occupied solely for the definition of red with different transparencies. The greater the action on the transparency of the pixels of an OSD, the more limited is the number of available colors. Therefore, the quality of an OSD is diminished.

SUMMARY OF THE INVENTION

In view of these drawbacks, it is an object of the present invention to overcome the above-mentioned drawbacks and to provide a method for improving the chromatics of OSDs on a video image. The number of colors available to create the OSD is increased while preserving the possibility of action on the transparency of each color. A programmable register plays a role in defining the transparency of a line of pixels of an OSD. Thus, the transparency of each pixel does not have to be stored in the color look-up table.

One embodiment of the present invention provides a method for forming an OSD for overlay on a video image. According to the method, colors that are to be used to display the OSD are stored in a color look-up table, and a coefficient of transparency is assigned to each line of pixels of the OSD before overlaying the OSD on the video image. In a preferred method, the colors are stored in the color look-up table as three significant values representing chrominance and luminance for each pixel of the OSD, and the assigned coefficients of transparency are stored in a programmable register.

Another embodiment of the present invention provides a device for forming an OSD for overlay on a video image. The device includes a color look-up table that stores a color for each pixel of the OSD, and a transparency programming register that assigns a transparency level to each line of pixels of the OSD. In one preferred embodiment, the transparency programming register has default values for the coefficients of transparency.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 1 shows a conventional structure for the code of an OSD;

FIGS. 2a and 2b respectively illustrate the problems of flicker and flutter during the display of an OSD on a video image background;

FIG. 3 shows one method for improving the vertical transition between an OSD and a video image by acting on the transparency of the pixels of the OSD; and FIG. 4 shows a preferred embodiment of a circuit for implementing the method of the present invention.

DETAILED DESCRIPTION OF PREFERRED EMBODIMENTS

Preferred embodiments of the present invention will be described in detail hereinbelow with reference to the attached drawings.

FIG. 4 shows a circuit according to a preferred embodiment of the present invention. As shown, a programming interface 400 of the OSD is connected to a memory module 402 by a first data bus 404. A second data bus 406 connects the programming interface 400 with a processing interface 408. A communications bus 410 connects the output of the memory module 402 to a color look-up table 412. A third data bus 414 and a fourth data bus 416 connect a multiplexer 418 with the processing interface 408 and the color look-up table 412, respectively. A fifth data bus 420 conveys the data elements output by the multiplexer 418 to a processing module 422.

A control bus 424 provides communication between a transparency programming register 426 and the processing module 422. The data elements output from the processing module 422 are communicated to an OSD insertion module 427 by a sixth data bus 428. A video signal 430 is also supplied to the OSD insertion module 427 through a link 429. Further, another link 431 enables the exchange of information between the OSD insertion module 427 and a television receiver 432. A control unit 433 controls the operation of the programming interface 400, the multiplexer 418, the transparency programming register 426, and the OSD insertion module 427.

The operation of the circuit of FIG. 4 in accordance with a preferred embodiment of the present invention will now be explained. A specific OSD is programmed through the programming interface 400. This programming interface is used to define the header of the OSD, the colors that will be used to display the OSD, and the values Y, U, and V of the luminance and chrominance for each pixel of the OSD. In the color look-up table 412, only the values of the luminance and the chrominance are stored. Thus, a gain in memory space is obtained. More specifically, the programming bits for the transparency are no longer stored in the table 412. This typically enables a memory space gain of about 20%. Furthermore, it is no longer necessary to keep the same color several times in the memory due to different transparency levels. This realizes a very significant gain in memory space.

During operation, the lines of pixels of the OSD that must undergo the application of a mathematical filter are processed by the processing interface 408. The lines of pixels of the OSD that do not have to undergo such processing are stored in the memory module 402. (Generally, a line of the OSD corresponds to a portion of a line of the screen.) In the preferred embodiment, for each pixel, only the address of the appropriate line of the color look-up table is memorized. For each pixel of the OSD that is not processed by the processing interface 408, the color look-up table 412 is designated by the addresses of the memory lines contained in the memory module 402.

The fourth data bus 416 connected to the output of the color look-up table conveys the values Y, U, and V for each pixel in the form of binary data elements. The multiplexer 418, which is controlled by the control unit 433, sends to the processing module 422 either the values Y, U, and V of luminance and chrominance from the processing interface 408 or the values Y, U, and V of luminance and chrominance from the color look-up table 412. The transparency programming register 426, which is directly programmable by the designer of the OSD, then enables action on the transparency of each of the lines of the OSD through the control bus 424.

In this manner, a specific transparency is associated with each pixel line of the OSD. Since each line of the OSD has been processed in the processing module 422, the OSD can be displayed on the video image in a conventional manner. For example, in the preferred embodiment, the OSD is inserted into the video image in the OSD insertion module 427 and is then transmitted by link 431, which can be a wired or RF link, to a television receiver (or station) 432.

The processing module 422 therefore enables the line-by-line processing of the transparency level of a line of pixels of the OSD. Thus, according to the preferred method of the present invention, each line of the OSD has a transparency that is determined by the transparency programming register. In general, only the lines of pixels of the OSD that are close to the lines of pixels of the original video image are assigned a non-zero transparency. The assigning of the transparency for each line of the OSD can be done automatically by the transparency programming register. For this purpose, the register can contain default values in memory. Transparency values can thus be assigned to n lines of the OSD constituting the previously-defined borderline zone in order to produce a transition of the type shown in FIG. 3. However, the number of lines of the boundary zone is not limited to three, but may be practically any number. Furthermore, the transparency coefficients can be assigned according to preset rules and stored in the transparency programming register.

Accordingly, the method of the present invention is preferably implemented in a circuit that includes a color look-up table that stores the color (e.g., in the form of luminance and chrominance information) of each pixel of the OSD to be displayed, and a transparency programming register that assigns a transparency level to each line of pixels of the OSD. The method of the present invention enables an improvement in the quality of the vertical transitions between the lines of pixels of an OSD and the lines of pixels of an original video image while making a large range of colors available for the definition of the OSD.

In particular, the programmable register plays a role in defining the transparency of a line of pixels of the OSD. Thus, the transparency of each pixel does not have to be stored in the color look-up table. Additionally, it is possible to define the total transparency of each line of pixels of the OSD when the OSD is made. The method of the present invention is especially suited to improving vertical transitions when the lines of the OSD constituting boundaries between the OSD and the video image are defined by a single color of the color look-up table.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for forming an on-screen display (OSD) for overlay on a video image, said method comprising the steps of:
storing colors that are to be used to display the OSD in a color look-up table; and
assigning a coefficient of transparency to each line of pixels of the OSD before overlaying the OSD on the video image,
wherein in the assigning step, the coefficients of transparency are assigned according to predetermined rules.

2. The method as defined in claim 1, further comprising the step of storing the assigned coefficients of transparency in a programmable register.

3. The method as defined in claim 1, wherein the predetermined rules are stored in a programmable register.

4. A method for forming an on-screen display (OSD) for overlay on a video image, said method comprising the steps of:
storing colors that are to be used to display the OSD in a color look-up table;
assigning a coefficient of transparency to each line of pixels of the OSD before overlaying the OSD on the video image; and
storing the assigned coefficients of transparency in a programmable register.

5. The method as defined in claim 4, wherein the colors are stored in the color look-up table as three significant values representing chrominance and luminance for each pixel of the OSD.

6. The method as defined in claim 4, further comprising the step of overlaying the OSD on the video image.

7. The method as defined in claim 4, further comprising the step of providing default values for the coefficients of transparency.

8. The method as defined in claim 4,
wherein in the assigning step, the coefficients of transparency are assigned according to predetermined rules, and the predetermined rules are stored in the programmable register.

9. The method as defined in claim 4, wherein in the assigning step, the coefficients of transparency are assigned according to predetermined rules.

10. A machine-readable medium encoded with a program for forming an on-screen display (OSD) for overlay on a video image, said program containing instructions for performing the steps of:

storing colors that are to be used to display the OSD in a color look-up table; and assigning a coefficient of transparency to each line of pixels of the OSD before overlaying the OSD on the video image, wherein in the assigning step, the coefficients of transparency are assigned according to predetermined rules.

11. The machine-readable medium as defined in claim 10, wherein said program further contains instructions for performing the step of storing the assigned coefficients of transparency in a programmable register.

12. The machine-readable medium as defined in claim 10, wherein the predetermined rules are stored in a programmable register.

13. A machine-readable medium encoded with a program for forming an on-screen display (OSD) for overlay on a video image, said program containing instructions for performing the steps of:

storing colors that are to be used to display the OSD in a color look-up table;

assigning a coefficient of transparency to each line of pixels of the OSD before overlaying the OSD on the video image; and storing the assigned coefficients of transparency in a programmable register.

14. The machine-readable medium as defined in claim 13, wherein the colors are stored in the color look-up table as three significant values representing chrominance and luminance for each pixel of the OSD.

15. The machine-readable medium as defined in claim 13, wherein said program further contains instructions for performing the step of providing default values for the coefficients of transparency.

16. The machine-readable medium as defined in claim 13, wherein in the assigning step, the coefficients of transparency are assigned according to predetermined rules.

17. The machine-readable medium as defined in claim 16, wherein the predetermined rules are stored in the programmable register.

18. A device for forming an on-screen display (OSD) for overlay on a video image, said device comprising:

a color look-up table storing a color for each pixel of the OSD; and a transparency programming register storing a coefficient of transparency for each line of pixels of the OSD, the transparency programming register being a programmable register.

19. The device as defined in claim 18, wherein the colors are stored in the color look-up table as three significant values representing chrominance and luminance for each pixel of the OSD.

20. The device as defined in claim 18, wherein the coefficients of transparency are assigned according to predetermined rules.

21. The device as defined in claim 20, wherein the predetermined rules are stored in the transparency programming register.

22. The device as defined in claim 18, wherein the transparency programming register has default values for the coefficients of transparency.

23. A device for forming an on-screen display (OSD) for overlay on a video image, said device comprising:

a color look-up table storing a color for each pixel of the OSD; and a transparency programming register assigning a coefficient of transparency to each line of pixels of the OSD, wherein the coefficients of transparency are assigned according to predetermined rules.

24. The device as defined in claim 23, wherein the transparency programming register stores the predetermined rules.

25. The device as defined in claim 23, wherein the transparency programming register stores the coefficient of transparency for each line of pixels of the OSD, the transparency programming register being a programmable register.

* * * * *